United States Patent

Richards

[11] Patent Number: 5,248,011
[45] Date of Patent: Sep. 28, 1993

[54] THREE WHEELED VEHICLE HAVING DRIVEN FRONT WHEELS AND STEERABLE REAR WHEEL

[76] Inventor: Donald C. Richards, P.O. Box 685, Walpole, N.H. 03608

[21] Appl. No.: 824,343

[22] Filed: Jan. 23, 1992

[51] Int. Cl.⁵ ............................................. B62D 61/06
[52] U.S. Cl. .................................... 180/215; 280/92; 280/691
[58] Field of Search ................ 280/98, 92, 691, 696; 180/215, 216, 210

[56] References Cited

U.S. PATENT DOCUMENTS

| | | | |
|---|---|---|---|
| D. 146,206 | 1/1947 | Andreau | 180/210 |
| 3,085,644 | 4/1963 | Van Der Lely | 180/210 |
| 4,020,914 | 5/1977 | Trautwein . | |
| 4,448,278 | 5/1984 | Badsey . | |
| 4,703,824 | 11/1987 | Iramajiri et al. . | |
| 4,787,470 | 11/1988 | Badsey . | |

FOREIGN PATENT DOCUMENTS

| | | | |
|---|---|---|---|
| 374068 | 4/1923 | Fed. Rep. of Germany | 180/215 |
| 500435 | 3/1920 | France | 280/92 |
| 980929 | 5/1951 | France | 180/215 |
| 1562161 | 4/1969 | France | 280/92 |
| 220906 | 4/1942 | Switzerland | 180/215 |
| 189167 | 11/1922 | United Kingdom | 180/210 |

Primary Examiner—Karin L. Tyson
Attorney, Agent, or Firm—Richard C. Litman

[57] ABSTRACT

A three wheeled vehicle has two wheels in front, front wheel drive, and a single rear wheel, and rear wheel steering. A novel steering linkage causes the vehicle to steer with directionally conventional response to a steering input, despite the rear wheel steering. A rear axle assembly provides uncomplicated construction accommodating both the steering and a spring and shock absorber type suspension. In a first embodiment, bodywork covers the front of the vehicle, spanning both front wheels. In a second embodiment, the bodywork is extended to envelope substantially the entire vehicle.

5 Claims, 6 Drawing Sheets

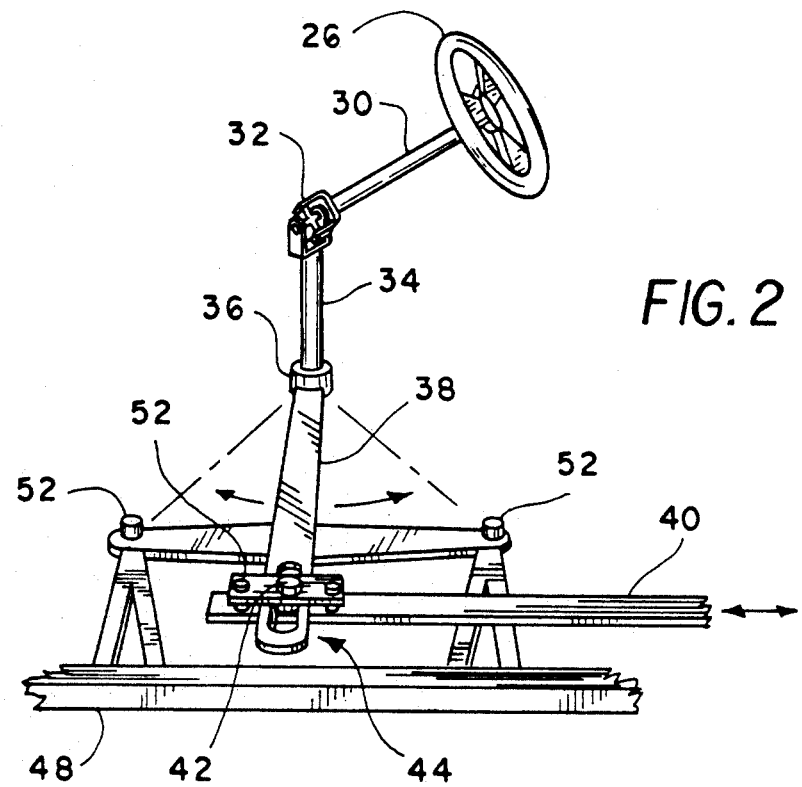
FIG. 2
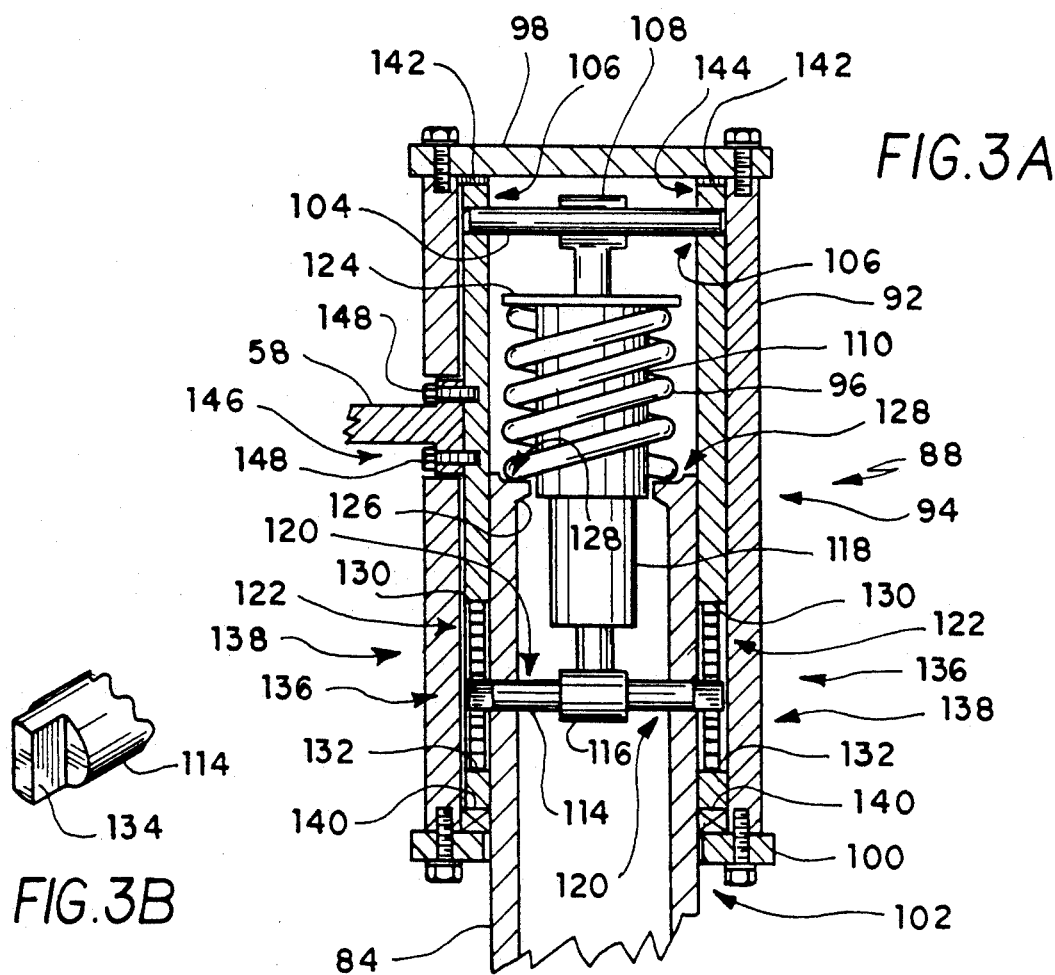
FIG. 3A
FIG. 3B

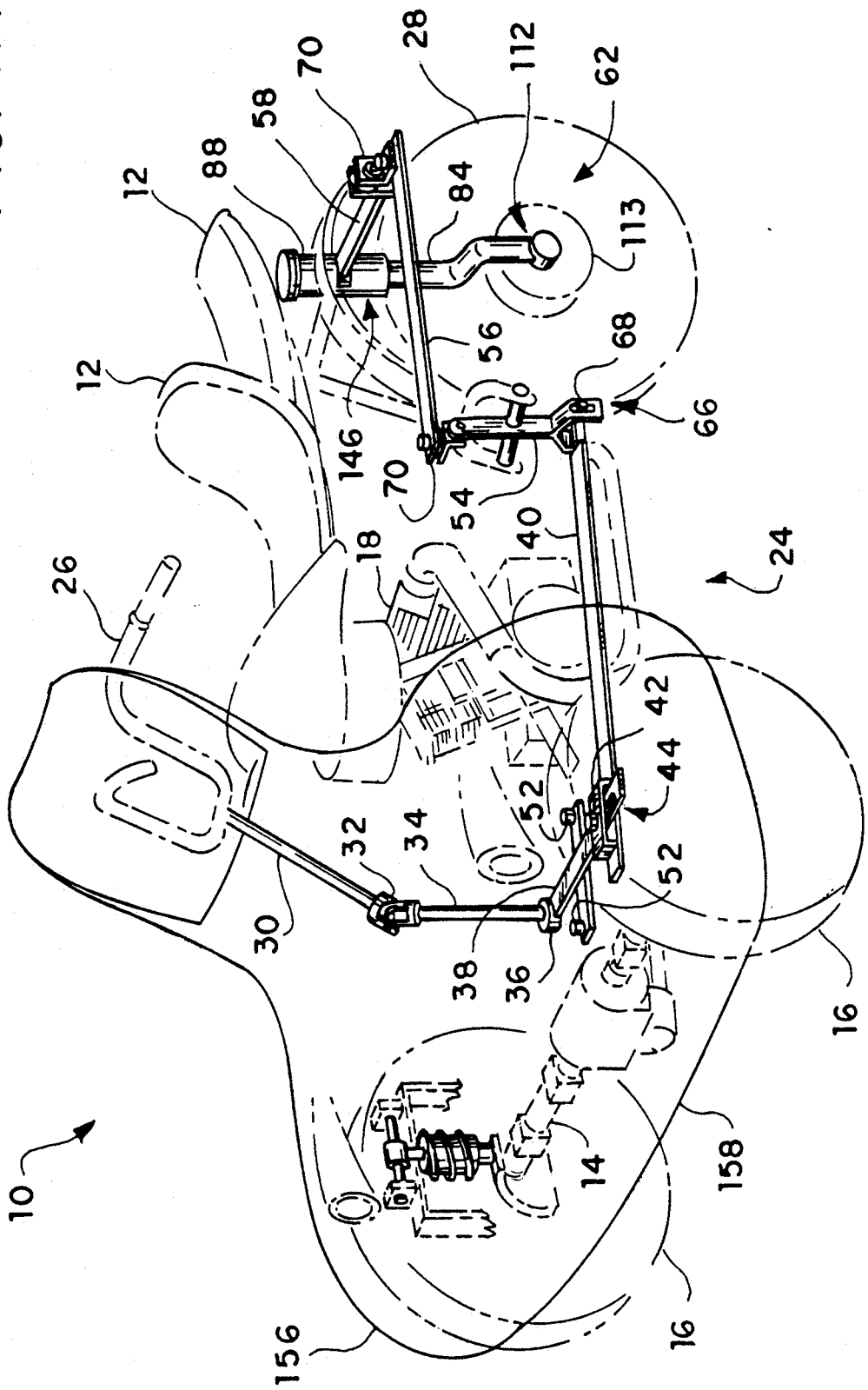

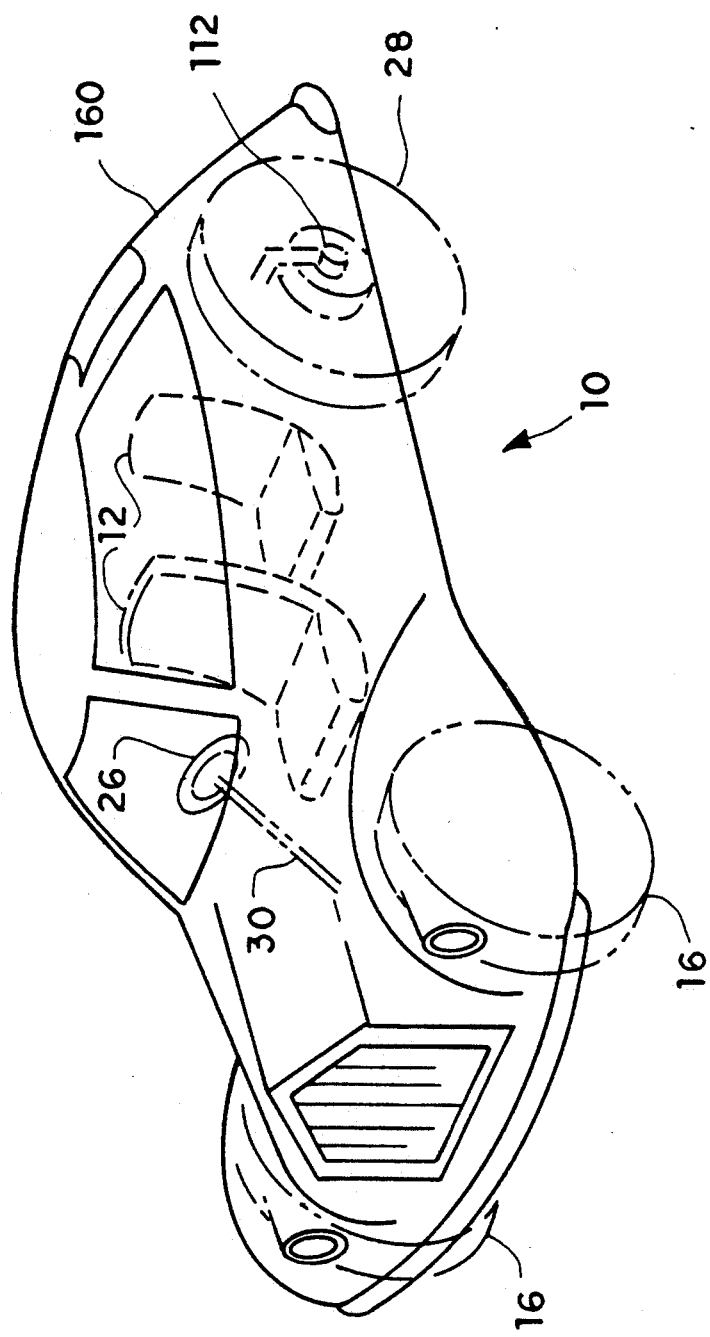

THREE WHEELED VEHICLE HAVING DRIVEN FRONT WHEELS AND STEERABLE REAR WHEEL

FIELD OF THE INVENTION

The present invention relates to a three wheeled powered vehicle, and more particularly to a three wheeled powered vehicle having one rear wheel providing steering and also having two driven front wheels.

DESCRIPTION OF THE PRIOR ART

Three wheeled vehicles having one rear and two front wheels are known. U.S. Pat. Nos. 4,020,914, issued to Wolfgang Trautwein on May 3, 1977; 4,448,278, issued to William J. Badsey on May 15, 1984; 4,787,470, issued to William J. Badsey on Nov. 29, 1988 are representative, each disclosing three wheeled vehicles steered from the front wheels and driven from the rear wheel. U.S. Pat. No. 4,703,824, issued to Shoichiro Irimajiri et al. on Nov. 3, 1987, discloses a three wheeled vehicle both steered and driven from the front.

Many advantages accrue from the concept of the three wheeled vehicle. However, cost of manufacture and repair and expense of operation are of paramount importance in personal transport vehicles. This is especially true of special duty second vehicles, for which the decision of an owner of whether to buy may well rest almost exclusively on purchase price and maintenance costs.

While each of the above inventions addresses a specific need or engineering concept, this is done from an engineering perspective, and simplicity of the device and other economies arising from the design may be neglected. Therefore, a need exists for an uncomplicated, economical three wheeled vehicle as provided in the present invention. None of the above inventions and patents, taken either singly or in combination, is seen to describe the instant invention as claimed.

SUMMARY OF THE INVENTION

The three wheeled vehicle of the present invention provides front wheel drive and rear wheel steering. A unique steering linkage and a novel rear strut and axle assembly simplify the vehicle, thereby reducing the cost of production and improving the ease of repair and maintenance.

A front compartment, ahead of the driver and between the front wheels, houses a clutch, transmission, and differential. An engine may be located under the driver's seat, motorcycle style, or in the front compartment. Independent front suspension is provided. All wheels are braked.

In a first embodiment, the three wheeled vehicle has a general appearance of a typically open motorcycle due to its partial body comprising a front fairing spanning both front wheels and extending to a windshield. A partial body having full width in the front provides a major safety advantage in that visibility of the vehicle to other drivers is greatly improved over a typical motorcycle having little frontal area. The vehicle is superior to a traditional two wheeled motorcycle due to added stability and skidding resistance provided by having three wheels.

A second embodiment provides the general appearance of a typical fully enclosed four wheeled vehicle. The full body covers front and rear wheels and defines a passenger compartment.

The advantage of separating the steering and driving functions between the two axles lies in the resultant simplicity of the components. Superior control resulting from front traction and satisfactory handling characteristics due to conventional independent suspension are retained. Steering from a single rear wheel eliminates parallelogram linkage, and further allows extremely sharp turns. This makes the vehicle very practical in an urban setting. The novel strut and axle assembly eliminates the usual fork straddling the rear tire. Component cost of and access to the tire for maintenance and repair are improved.

Accordingly, an object of the present invention is to provide a three wheeled vehicle having steering and driving functions separated between the two axles.

A second object is to provide a three wheeled vehicle having rear wheel steering.

Another object is to provide a rear strut and axle assembly which permits suspension rebound while maintaining an attitude determined by a steering input.

An additional object is to provide a three wheeled vehicle having bodywork spanning both wheels of a front axle, so as to provide maximum frontal visibility.

These and other objects of the present invention will become readily apparent upon further review of the following specification and drawings.

BRIEF DESCRIPTION OF THE DRAWINGS

FIG. 2 is a perspective detail view of the invention as shown in FIG. 1.

FIG. 3A is a partial sectional detail view of the rear strut and axle assembly of FIG. 1 drawn to enlarged scale.

FIG. 3B is a fragmentary perspective detail view taken from the lower left center of FIG. 3A and drawn to enlarged scale.

FIG. 4A is a perspective view of a first embodiment of the invention, and emphasizing the bodywork.

FIG. 4B is a perspective view of a second embodiment emphasizing the bodywork.

Similar reference characters denote corresponding features consistently throughout the attached drawings.

DETAILED DESCRIPTION OF THE PREFERRED EMBODIMENTS

Figure 1:
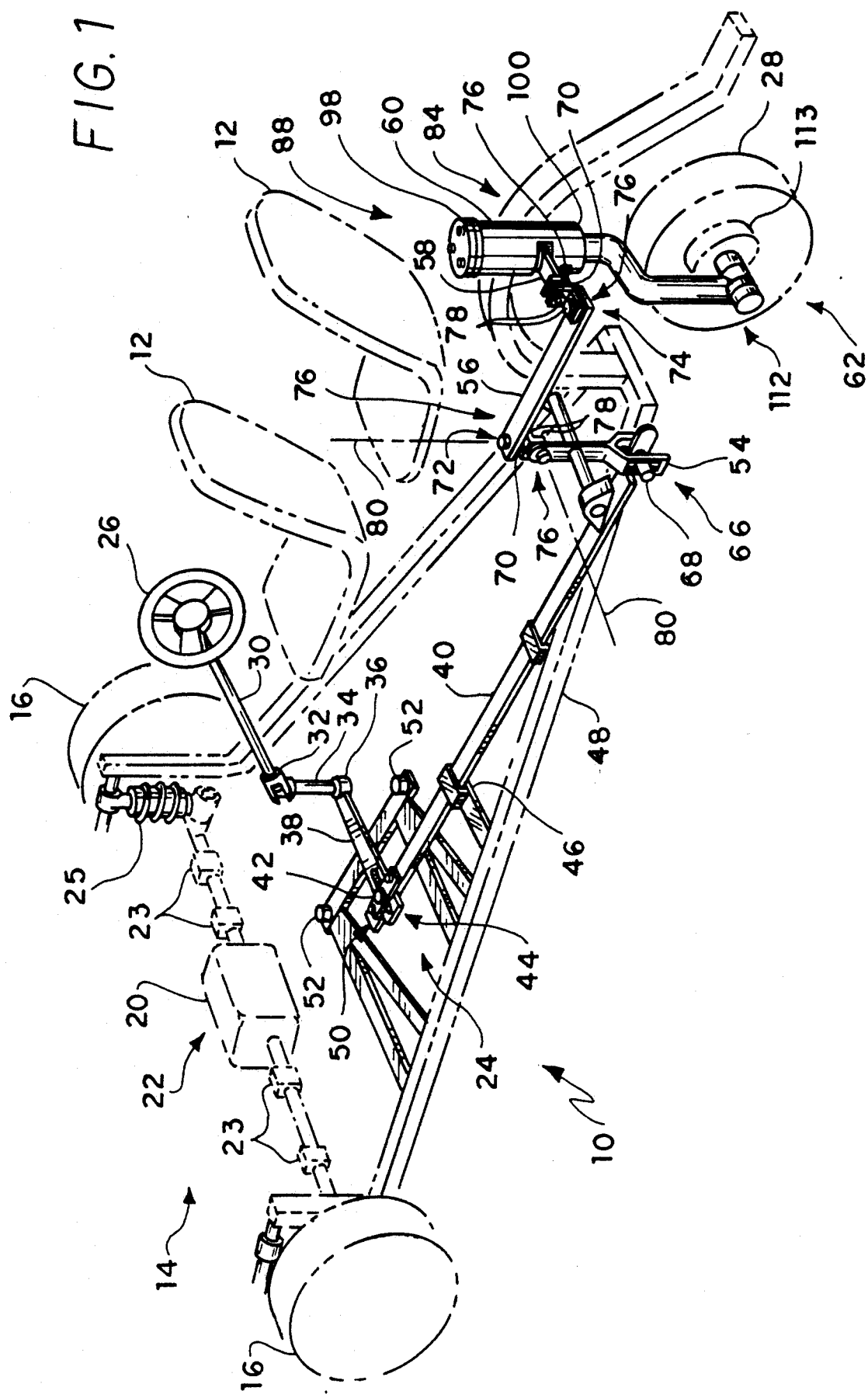
FIG. 1 is a partial perspective view of the vehicle.
Figure 5:
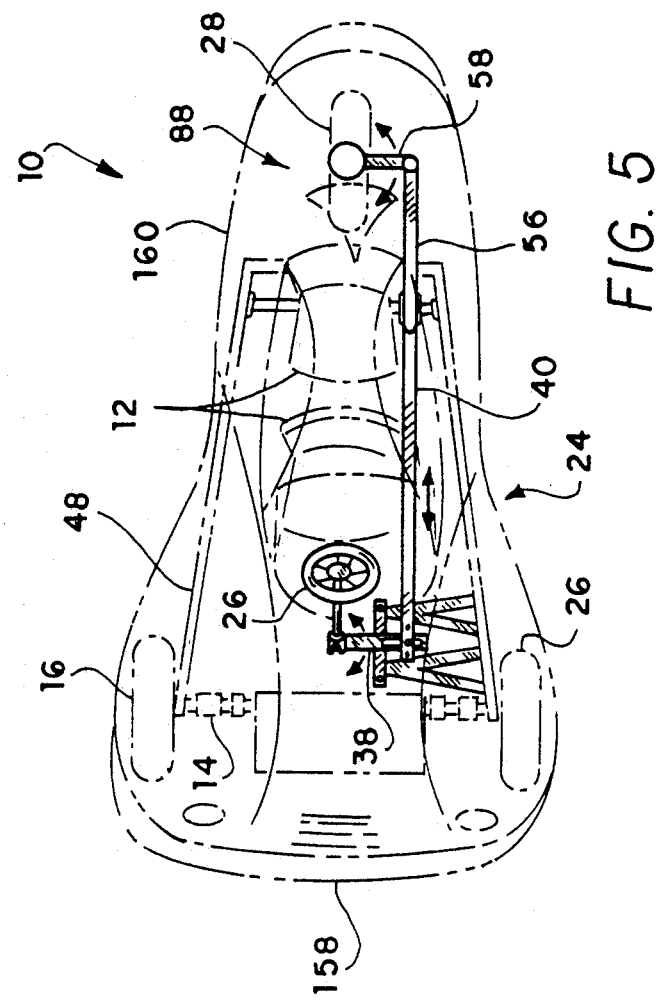
FIG. 5 is a top plan view of the invention illustrating a second embodiment, the vehicle body being shown in phantom lines.

The present invention is seen in FIG. 1 to comprise a three wheeled vehicle 10 having two passenger seats 12 arranged in tandem. The front axle 14 has two wheels 16 disposed thereon, these two wheels 16 being driven in conventional fashion by an engine 18 (better seen in FIG. 4A) through a transmission 20 and a differential gear assembly 22. The vehicle 10 preferably has independent suspension, including universal joints 23 and front suspension springs 25.

As shown in FIGS. 1 and 2, a steering linkage 24 provides translation of motion from a steering wheel or handle bar 26 to the rear wheel 28 which causes directional response of the vehicle 10 to follow conventional practice; that is, a clockwise turn to the steering wheel or handle bar 26 (as seen by the driver) steers the vehicle 10 to the right. It is to be understood that major components of the vehicle 10 such as steering linkage 24, engine 18, transmission 20 and similar items are to be secured to the vehicle 10 in any suitable manner well known to those skilled in the art, and thus further details are omitted.

The steering wheel or handle bar 26 rotates a steering shaft 30 which includes a universal joint 32. A vertical extension 34 of the steering shaft 30 terminates at a flange 36 supporting a radius arm 38.

As best seen in FIG. 2, the radius arm 38, which turns in lockstep with the steering wheel or handle bar 26, moves a longitudinal member 40 in linear fashion. A pin or bolt 42 fastened to the longitudinal member 40 rides in a slot 44 disposed in the radius arm 38. The longitudinal member 40 is constrained by suitable brackets 46 attached to the vehicle frame 48 to move linearly fore and aft with respect to the vehicle 10. The pin or bolt 42 also secures a retainer 50 which holds the radius arm 38 in operative relation to the longitudinal member 40. Stops 52 disposed on the vehicle frame 48 limit angular travel of the radius arm 38.

Experience with single wheel steering shows that 85 degrees of arc of steering rotation provides the ability to achieve very sharp turns. This is a great advantage to a vehicle in urban use, wherein parking and general maneuvering may be available only to vehicles having extreme maneuvering capabilities. Also, since the rear of such a vehicle will ordinarily be lighter than the front, the present arrangement reduces steering effort by the driver.

The longitudinal member 40 connects to a pivoting member 54, which in turn moves a short longitudinal member 56 fore and aft. The short longitudinal member 56 moves a rear radius arm 58 attached to a cylindrical housing 60 of the rear axle assembly 62. The pivoting member 54 has an elongate slot 66 surrounding a pin 68 connected to the longitudinal member 40. This arrangement permits operative interengagement of the longitudinal member 40, which moves linearly, with the pivoting member 54. Similarly, accommodation of motion as the short longitudinal member 56 moves in all three planes while transferring steering inputs to the rear radius arm 58 is provided by two universal joints 70 located at the forward and rear ends 72, 74 of the short longitudinal member 56. These universal joints 70 comprise ball bearing assemblies 76 fastened to plates 78, the ball bearing assemblies 76 having rotating axes 80 normal to one another. Obviously, the geometry of both universal joints 70 is substantially identical, even though rotating axes 80 are shown for only one universal joint 70.

The cylindrical outer housing 60 is keyed to a vertically oriented segment 84 of the rear axle assembly 62 which rear axle assembly 62 supports and turns the rear wheel 28. This keyed relationship will be understood as the rear axle assembly 62 is explained.

The vertically oriented segment 84 of the rear axle assembly 62 rides concentrically within a tower assembly 88 comprising an cylindrical outer housing 60 firmly secured to the vehicle 10, an inner rotating cylinder 92, a shock absorber 94 and rear suspension spring 96. The inner rotating cylinder 92 is constrained to rotate upon receiving steering inputs from the rear radius arm 58, and not move axially. Axial displacement is prevented by upper and lower caps 98,100 bolted to the outer cylindrical housing 60. The lower cap 100 has an orifice 102 defined therein allowing passage therethrough of the axle upper segment 84.

A top pin 104 penetrating diametrically opposing bores 106 in the inner rotating cylinder 92 also penetrates a boss 108 attached to an upper, stationary part 110 of a shock absorber 94. Because the top pin 104 is anchored within the inner rotating cylinder 92, the upper, stationary part of the shock absorber 94 does not experience vertical displacement.

A bottom pin 114 penetrates a lower boss 116 in the lower, vertically displaceable portion 118 of the shock absorber 94 and penetrates diametrically opposed bores 120 in the axle vertical segment 84. The bottom pin 114 extends beyond the axle vertical segment 84 into slots 122 formed in the inner rotating cylinder 92.

The rear suspension spring 96 is retained between an upper flange 124 secured to the shock absorber upper part 110 and a lower flange 126 formed at the top surface 128 of the axle vertical segment 84.

The bottom pin 114 keys the suspension strut 84 to rotate in lockstep with the inner rotating cylinder 92. Because of the elongate nature of the slots 122, the axle vertical segment 84 may slide axially within the tower assembly 88 to a limited degree, which motion accommodates vertical displacement periodically encountered as the vehicle rear wheel 28 negotiates minor obstructions in a road, such as stones or potholes. The upper and lower surfaces 130,132 of the slots 122 serve as stops limiting this motion. Therefore, within limits imposed by the elongate dimension of the slots 122, the rear axle assembly 62 may rise and fall as road conditions demand while being keyed to rotate with, and thereby accept steering inputs from, the inner rotating cylinder 92.

At its lower end 112, the rear axle assembly 62 connects to and supports the rear wheel 28. This is done in conventional fashion, and includes a brake drum assembly 113, understood to include necessary wheel bearings (not shown).

The bottom pin 114 is machined to present a planar surface 134 facing the sides 136 of the slots 122, as seen in FIG. 3B. The slots 122 have needle bearing assemblies 138 to reduce wear due to frictional contact as the bottom pin 114 rises and descends therein.

Roller bearings 140 support the inner rotating cylinder 92 within the cylindrical outer housing 60. Washers 124 having low friction surfaces, such as provided by PTFE compounds, for example, are employed at the top 144 of the inner rotating cylinder.

An aperture 146 defined in the cylindrical outer housing 60 allows communication of the radius arm 58 with the inner rotating cylinder 92, to which the radius arm 58 is suitably fastened, as by bolts 148.

Figure 6:
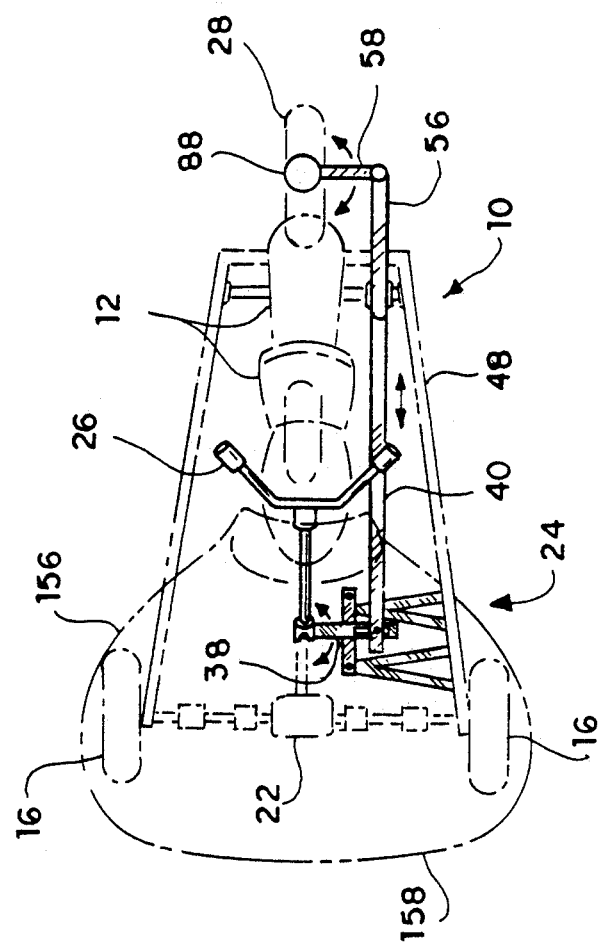
FIG. 6 is a top plan view of the invention illustrating a first embodiment, the vehicle body being shown in phantom lines.
Figure 7:
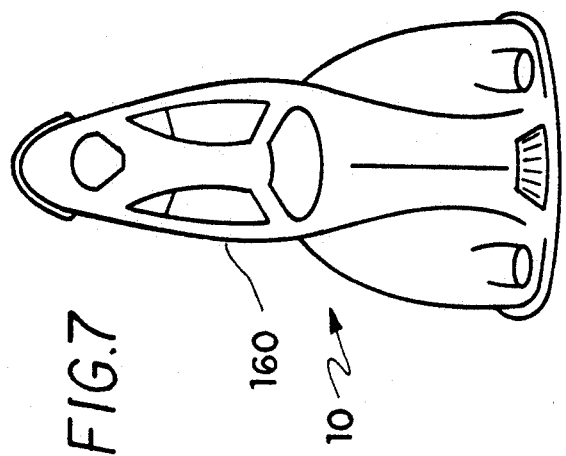
FIGS. 7, 8 and 9 are, respectively, top plan, side elevational, and front elevational views of the second embodiment.
Figure 8:
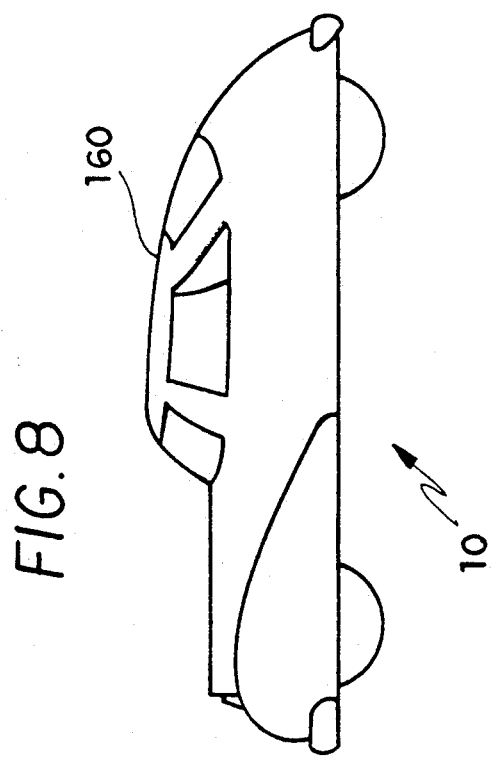
Figure 9:
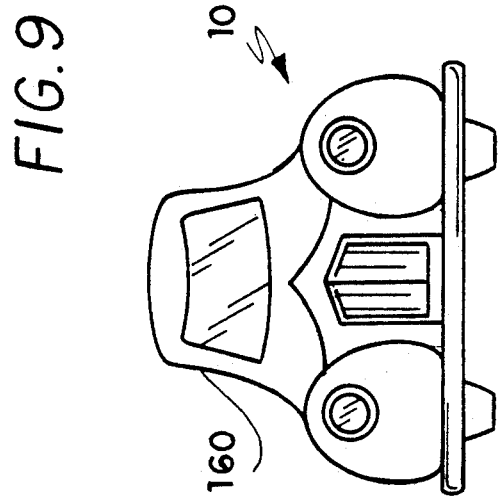

The present invention has two embodiments. In a first embodiment shown in FIGS. 4A and 6, bodywork 156 extends from the front 158 of the vehicle 10 to just behind the front wheels 16. In this embodiment, the vehicle 10 appears similar to a motorcycle, while retaining certain advantages presented herein arising from the novel arrangement of mechanical components.

In a second embodiment, shown in FIGS. 4B, 5, 7, 8 and 9, bodywork 160 extends beyond the bodywork 156 of the first embodiment to envelope the entire vehicle 10. This embodiment essentially simulates a conventional fully enclosed automobile, while retaining the qualities of rear wheel steering, three wheels, and reduced weight and complexity, while retaining certain advantages of conventional vehicles.

It is to be understood that the present invention is not limited to the sole embodiments described above, but encompasses any and all embodiments within the scope of the following claims.

I claim:

1. A three wheeled vehicle, there being a front axle and a rear axle mounted thereon, two front wheels disposed upon said front axle and one rear wheel disposed upon said rear axle, said vehicle including at least one passenger seat mounted thereon, power means mounted within said vehicle, transmission means operably connected to said power means and to said front wheels, thereby driving said front wheels, suspension means mounted to said vehicle and connecting said front wheels and said rear wheel thereto, and steering means mounted to said vehicle and to said rear wheel, said steering means controlling said rear wheel, said steering means causing directional response of said vehicle to a steering input wherein clockwise rotation of a steering shaft, as viewed by a driver, causes said vehicle to steer to a right side direction, and counterclockwise rotation of said steering shaft, as viewed by a driver, causes said vehicle to steer to a left side direction, wherein said two front wheels are driven by said power means through said transmission means and said rear axle further having suspension means including spring means and shock absorbing means disposed within inner and outer concentric members, said inner and outer concentric members being mechanically linked one to another whereby said inner and outer concentric members rotate to the same degree while permitting said inner concentric member to be axially displaced while said outer concentric member is axially immobilized, and whereby said rear wheel may be vertically displaced relative to said three wheeled vehicle while maintaining an attitude determined by a steering input and simultaneously maintaining a portion of the weight of said three wheeled vehicle supported on said rear wheel.

2. The invention of claim 1, further having bodywork covering, partially enclosing, and spanning both of said front wheels, and extending from a front of said vehicle to behind said front wheels.

3. The invention of claim 1, further having bodywork covering, partially enclosing, and spanning both of said front wheels, and extending from a front of said vehicle to behind said rear wheel.

4. The invention of claim 1, further having bodywork covering, partially enclosing, and spanning at least both of said front wheels, and extending from a front of said vehicle to at least behind said front wheels.

5. The invention of claim 4, further having bodywork covering, partially enclosing, and spanning both of said front wheels, and extending from a front of said vehicle to behind said rear wheel.

* * * * *